United States Patent
Baker et al.

(10) Patent No.: US 9,506,453 B2
(45) Date of Patent: Nov. 29, 2016

(54) ACTUATION OF DISTRIBUTED LOAD MANAGEMENT DEVICES ON AERODYNAMIC BLADES

(71) Applicant: Frontier Wind, LLC, West Conshohocken, PA (US)

(72) Inventors: Jonathon Paul Baker, Roseville, CA (US); Jeffrey Austin Butterworth, Rocklin, CA (US); Jehan Zeb Khan, Lisle, IL (US); Guojian Lin, West Sacramento, CA (US); Edward Anthony Mayda, Thornton, CO (US); Erick James Rickards, Rocklin, CA (US); Tobias Guenther Wehrhan, Davis, CA (US)

(73) Assignee: Frontier Wind, LLC

( * ) Notice: Subject to any disclaimer, the term of this patent is extended or adjusted under 35 U.S.C. 154(b) by 746 days.

(21) Appl. No.: 13/837,220

(22) Filed: Mar. 15, 2013

(65) Prior Publication Data

US 2014/0271184 A1 Sep. 18, 2014

(51) Int. Cl.
*F04D 27/02* (2006.01)
*F03D 7/02* (2006.01)

(52) U.S. Cl.
CPC ............ *F03D 7/022* (2013.01); *F03D 7/024* (2013.01); *F03D 7/0232* (2013.01); *F05D 2240/31* (2013.01); *Y02E 10/721* (2013.01); *Y02E 10/722* (2013.01); *Y02E 10/723* (2013.01)

(58) Field of Classification Search
CPC ...... F03D 7/022; F03D 7/024; F03D 7/0232; F03D 7/0252; F03D 7/042; F03D 7/045; Y02E 10/721; Y02E 10/723; Y02E 10/722; F05D 2240/31

USPC .......... 415/1; 416/23–24, 31–32, 36–37, 41, 416/44, 47–48
See application file for complete search history.

(56) References Cited

U.S. PATENT DOCUMENTS

| 2,622,686 A | 12/1952 | Chevreau et al. |
| 2009/0284016 A1* | 11/2009 | Van Dam .................. F03D 1/06 290/54 |

(Continued)

FOREIGN PATENT DOCUMENTS

| EP | 2128385 A2 | 12/2009 |
| JP | 2003056924 A | 2/2003 |
| WO | 0238442 A2 | 5/2002 |

OTHER PUBLICATIONS

Apr. 2, 2015—(JP) Office Action—App 2014-052923.

(Continued)

*Primary Examiner* — Kenneth Bomberg
*Assistant Examiner* — Jason T Newton
(74) *Attorney, Agent, or Firm* — Banner & Witcoff, Ltd.

(57) ABSTRACT

Systems, apparatuses, and methods are provided for actuating less than all of a plurality of load management devices on a wind turbine and/or a wind turbine blade. In some embodiments, the actuation sequences may be a root-to-tip, tip-to root, maximum-distributed-load, random, and/or a cycle-count actuation sequence. Further, a combination of two or more actuation sequences may be utilized to achieve a desired result. The system may choose an appropriate blade-based and/or rotor-based actuation sequence according to operating conditions, may alternate actuation sequences, and/or may employ different actuation sequences among the plurality of blades of a wind turbine. The load management devices may be actuated to different maximum heights and/or may be configured to be actuated to variable heights. The load management devices may be included as part of a distributed management system providing a corresponding controller and/or sensor at each load management device.

20 Claims, 6 Drawing Sheets

(56) References Cited

U.S. PATENT DOCUMENTS

| | | | | |
|---|---|---|---|---|
| 2009/0285682 | A1* | 11/2009 | Baker | F03D 1/0641 416/1 |
| 2010/0021300 | A1* | 1/2010 | Noguchi | F03D 3/062 416/37 |
| 2010/0263448 | A1* | 10/2010 | Hughes | F03D 1/065 73/577 |
| 2012/0141268 | A1* | 6/2012 | Pesetsky | F03D 7/0232 416/1 |
| 2013/0032671 | A1* | 2/2013 | Giles | B64D 15/16 244/134 R |

OTHER PUBLICATIONS

Nov. 26, 2014—(EP) European Search Report—App 14159295, Oct. 9, 2015.
Jan. 30, 2015—(KR) Notice of Preliminary Rejection—App1020140030181.

* cited by examiner

ACTUATION OF DISTRIBUTED LOAD MANAGEMENT DEVICES ON AERODYNAMIC BLADES

TECHNICAL FIELD

This application relates generally to the design and control of a wind turbine. More particularly, some aspects of the invention relate to modifying the aerodynamics of a wind turbine.

BACKGROUND

With their decreased availability and adverse impact to the environment, fossil fuels and other conventional energy sources are continually declining in popularity while clean, renewable energy source have seen rapid growth. In the coming years, as these fossil fuels continue to become scarce and as knowledge regarding the environmental impact of such energy sources becomes available, the demand for clean, renewable energy will continue to increase. One such source of clean, renewable energy is wind power. For example, kinetic energy from wind may be transmitted into electricity using, e.g., a wind turbine. Accordingly, electricity may be produced without burning any of these costly, environmentally hazardous fossil fuels.

Wind turbines create power proportional to the swept area of their blades. Thus, by increasing the length (e.g., span) of wind turbine blades, more energy may be produced. However, the choice of rotor attributes for a wind turbine, such as its diameter, is a design trade-off between longer blades for more energy production in low winds and shorter blades for load limitation in high winds. A wind turbine having longer blades will increase the swept area, which in turn produces more power. But at high wind speeds, a wind turbine having longer blades places greater demands on the components and creates more situations where the turbine must be shut down to avoid damaging components. Even in situations where the average wind speed is not high enough to cause damage, periodic wind gusts may change both the speed and direction of the wind and apply forces that may be strong enough to damage equipment.

Approaches with varying levels of success have been attempted in achieving higher power, fewer shut downs, and less instances of damage to components. For example, pitch control has been used to vary the pitch of the blade (i.e., the angle of the blade). On a pitch controlled wind turbine, an electronic controller on the turbine checks the power output of the turbine. When the power output exceeds a certain threshold, the blade pitch mechanism turns the rotor blades to reduce the loads on the rotor blades. The blades are later turned back when the wind drops again. However, pitch control can be fairly slow to respond to changes in the wind and is relatively ineffective to loads imparted by sudden wind gusts.

Stall control is another approach that has been used in an attempt to achieve higher power, and to reduce shut downs and damage to components. In passive-type stall controlled wind turbines, the rotor blades are mounted to the hub at a fixed angular orientation. The stall control is achieved passively by the shape of the blade being such that the blade goes into aerodynamic stall (destroying lift) when the wind speed exceeds a certain threshold. Active-type stall controlled wind turbines exist. In such systems, the rotor blades are adjusted in order to create stall along the blade. However, both types of stall control systems can be difficult to optimize and slow to respond, and may suffer from lower predictability of results than desired. These drawbacks are magnified in conditions with erratic winds and wind gusts.

Variable length rotor blade systems have also been used as an attempt to achieve higher power, and experience fewer shut downs and less damage to components. In such systems, the wind turbine rotor blades are telescopic so that their length can be adjusted based on the wind speed. Such provides advantages in that the rotor blades can be extended to provide higher output in low wind conditions and retracted to lower loads in high wind conditions. U.S. Pat. No. 6,902,370, titled "Telescoping Wind Turbine Blade" and which is hereby incorporated by reference in its entirety, discloses a wind turbine system having telescoping wind turbine rotor blades. While variable length rotor blade systems have certain advantages, they may suffer drawbacks in erratic wind conditions or may be too slow to respond when experiencing a wind gust.

More recently, deflectors have been used to control loads on a wind turbine's components. For example, deflectors have been used to disrupt the airflow on a wind turbine blade thus reducing lift and the corresponding load placed on the wind turbine components. For example, U.S. Pat. No. 8,267,654, titled "Wind Turbine with Deployable Air Deflectors" and which is hereby incorporated by reference in its entirety, describes the use of deflectors on a wind turbine blade to control loads. These deflectors are deployed when a sensor or other component senses power production, speed, acceleration, loads, or the like has exceeded a threshold value, and the deflectors are thus deployed to bring the sensed power production, speed, acceleration, loads, etc. back within the threshold.

In some instances, multiple deflectors are used on a wind turbine and/or a wind turbine blade to control loads. For example, in some embodiments, multiple deflectors are arranged along the length of a wind turbine blade. Accordingly, one or more of the multiple deflectors may be deployed to control load as discussed above. However, in such embodiments, some deflectors may be deployed more than others, leading to hyperactivity of some (and thus early failure) and under usage of others. Further, depending on a spanwise location of each deployed air deflector, for certain conditions some deflectors may be less effective than others, leading to more than necessary deflectors being deployed (and thus ultimately increasing the duty cycle total for the system as a whole).

As electricity continues to become a more valuable commodity, and as wind turbines present an environmentally-friendly solution to solve electricity shortage problems, a wind turbine design that overcomes the aforementioned drawbacks and provide increased power and decreased turbine shut downs and damage to components is thus desirable.

BRIEF SUMMARY

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

One or more aspects of the invention overcomes the limitations in the prior art by providing actuation sequences to actuate one or more load management devices on an airfoil. For example, in some embodiments actuation sequences are provided for actuating less than all of a plurality of load management devices on a wind turbine and/or a wind turbine blade. The actuation sequences may be employed in response to sensed operating conditions, such that a desired result (e.g., reduced loads such as loads on the blades, tower, drive train, etc.; increased power; reduce duty cycles of load management devices; etc.) may be achieved.

According to some aspects, a root-to-tip actuation sequence may be employed. In such embodiments, one or more inboard-most load management devices of a wind turbine and/or a wind turbine blade may be actuated in order to achieve a desired result.

According to other aspects, a tip-to-root actuation sequence may be employed. In such embodiments, one or more outboard-most load management devices of a wind turbine and/or a wind turbine blade may be actuated in order to achieve a desired result.

According to other aspects, a maximum-distributed-load actuation sequence may be employed. In such embodiments, one or more load management devices of a wind turbine and/or a wind turbine blade may be actuated near a location of a sensed maximum aerodynamic load.

According to other aspects, a random actuation sequence may be employed. In such embodiments, one or more random load management devices of a wind turbine and/or a wind turbine blade may be actuated.

According to other aspects, a cycle-count actuation sequence may be employed. In such embodiments, one or more load management devices of a wind turbine and/or along a wind turbine blade may be actuated which have the lowest total cumulative deployment cycles.

According to other aspects, a combination of two or more actuation sequences may be employed on a wind turbine and/or a wind turbine blade. For example, in some embodiments root-to-tip actuation sequences may be employed for certain sensed operating conditions, while tip-to-root actuation sequences may be employed for other sensed operating conditions. In some embodiments, a random actuation sequence or a cycle-count actuation sequence may be employed on less than all of the blades of a wind turbine with a different actuation sequence (e.g., root-to-tip, tip-to-root, maximum-distributed-load, etc.) employed on the remaining blades of the wind turbine. In other embodiments, one or more actuation sequence may be alternated on a wind turbine and/or a blade of a wind turbine with one or more other actuation sequence.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Aspects of the present invention are directed to multiple load management devices disposed on a wind turbine and methods of actuating one or more of the load management devices in response to sensed operating conditions. In addition, aspects of the invention are directed to actuating less than all of the load management devices on a wind turbine blade, and actuation sequences used in determining which load management devices to actuate.

Figure 1:
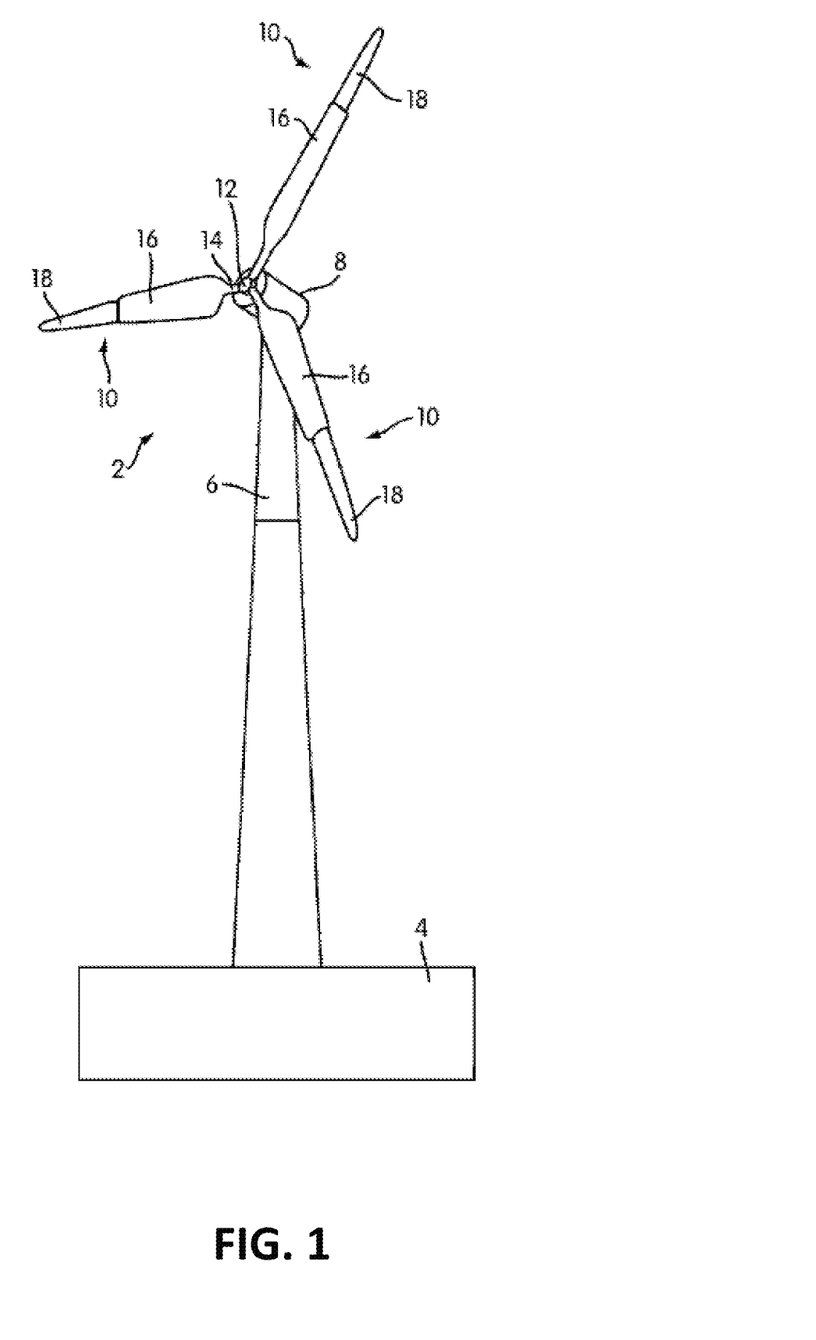
FIG. 1 is a perspective view of a wind turbine according to a first embodiment of the invention.

FIG. 1 shows a wind turbine 2 on a foundation 4 with a tower 6 supporting a nacelle 8. One or more blades 10 are attached to a hub 12 via a bolt flange 14. In the depicted embodiment, the wind turbine includes three blades 10. The hub 12 is connected to a gear box, a generator, and other components within the nacelle 8. The blades 10 may have a fixed length or may be of the variable length-type, i.e., telescopic, such as shown in FIG. 1. As shown in FIG. 1, each variable length blade 10 includes a root or base portion 16 and a tip portion 18. The tip portion 18 is movable with respect to the root portion 16 so as to controllably increase and decrease the length of the rotor blade 10, and in turn, respectively increase and decrease the swept area of the rotor blades 10. Any desirable drive system, such as a screw drive, a piston/cylinder, or a pulley/winch arrangement may be used to move the tip portion 18 with respect to the root portion 16. Such drive systems are described in U.S. Pat. No. 6,902,370 titled "Telescoping Wind Turbine Blade," which is hereby incorporated by reference in its entirety. The wind turbine 2 further includes a yaw drive and a yaw motor, not shown.

Figure 2:
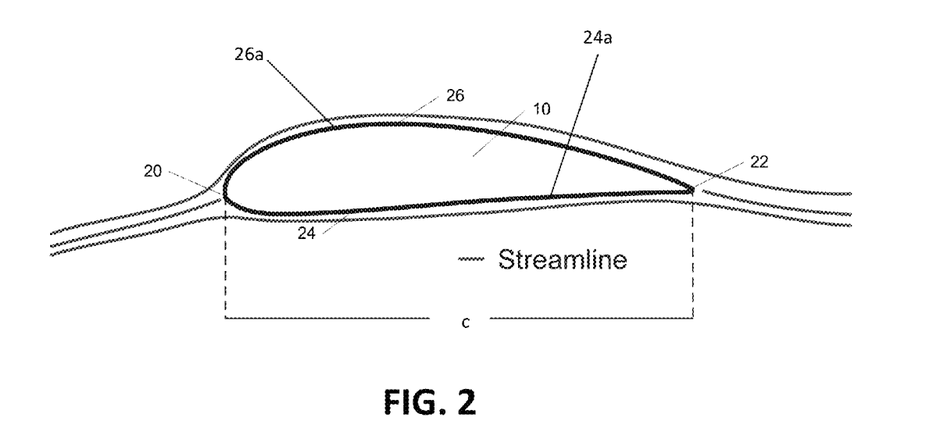
FIG. 2 is a schematic sectional view of a rotor blade representing airflow under normal wind conditions.
Figure 3:
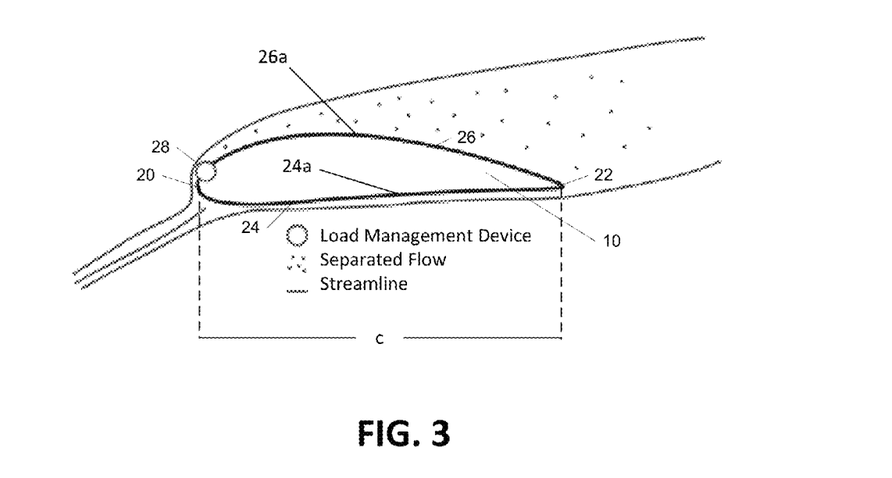
FIG. 3 is a schematic sectional view of the rotor blade of FIG. 2 representing airflow with a load management device in an extended position.

Each rotor blade 10 may include one or more load management devices 28 as schematically depicted in FIG. 3. The blade 10 depicted in the figures is merely one illustrative cross-sectional design and it is recognized that infinite cross-sectional variations can be used as part of the present invention. The rotor blade 10 may be made of any suitable construction and materials, such as fiberglass and/or carbon fiber. Load management devices 28 located on blade 10 may disrupt the airflow along the rotor blade 10 in order to, e.g., destroy lift at the rotor blade 10 (and thus reduce corresponding loads on components of wind turbine 2). The functionality of load management devices 28 is generally illustrated in FIGS. 2-3. For example, FIG. 2 shows a rotor blade 10 being subjected to airflow under normal wind conditions. Rotor blade 10 has a leading edge 20, a trailing edge 22, a high pressure side 24, and a low pressure side 26. A chord line c can be defined as a line between the leading edge 20 and trailing edge 22 of the blade 10. It is recognized that the leading side of the rotor blade 10 corresponds to the leading half of the rotor blade 10 and the trailing side of the rotor blade 10 to the trailing half of the rotor blade 10.

Without any load management device 28 actuated (as shown in, e.g., FIG. 2), a lift force created by a difference in pressure between low pressure side 26 and high pressure side 24 will increase as wind speed increases. For example, the more curved surface 26a and the opposing less curved surface 24a create the dynamics of the low pressure side 26 and the high pressure side 24 due to well-known principles of aerodynamics. This, in combination with the airflow over the rotor blade 10, creates an effect known as "lift" that assists in the rotation of the rotor. Absent load management devices 28, in high wind speeds, a wind turbine 2 could experience damaging loads to one or more components. For example, because loads on various components increase as rotor speed of the wind turbine 2 increases, and because the lift created between a difference in pressure on low pressure side 26 and high pressure side 24 will continue to increase with wind speed thus increasing rotor speed of the wind turbine 2, if wind speeds become too high, wind turbine 2 may experience damaging loads.

Thus, some aspects of the invention utilizes one or more load management devices 28 to disrupt airflow along rotor blade 10 when, e.g., wind speed becomes too high, thus decreasing lift and rotor speed, and reducing the load on wind turbine 2 and its various components. FIG. 3 illustrates rotor blade 10 utilizing load management device 28. Load management device 28 may be any load management device suitable for disrupting airflow. According to some aspect of the invention, load management device 28 may be, e.g., an air deflector as will be discussed more fully. Load management device 28 is actuated when a sensor determines the rotor blade 10 is exceeding a maximum rated speed of the wind turbine 2 and/or when a sensor senses loads on various components of wind turbine 2 are exceeding threshold values. Load management device 28 induces flow separation along a side of the rotor blade 10 (in the depicted embodiment, along low pressure side 26). Accordingly, when actuated, load management device 28 may help decrease loads experienced by various components of wind turbine 2 in, e.g., high wind conditions.

Figure 4:
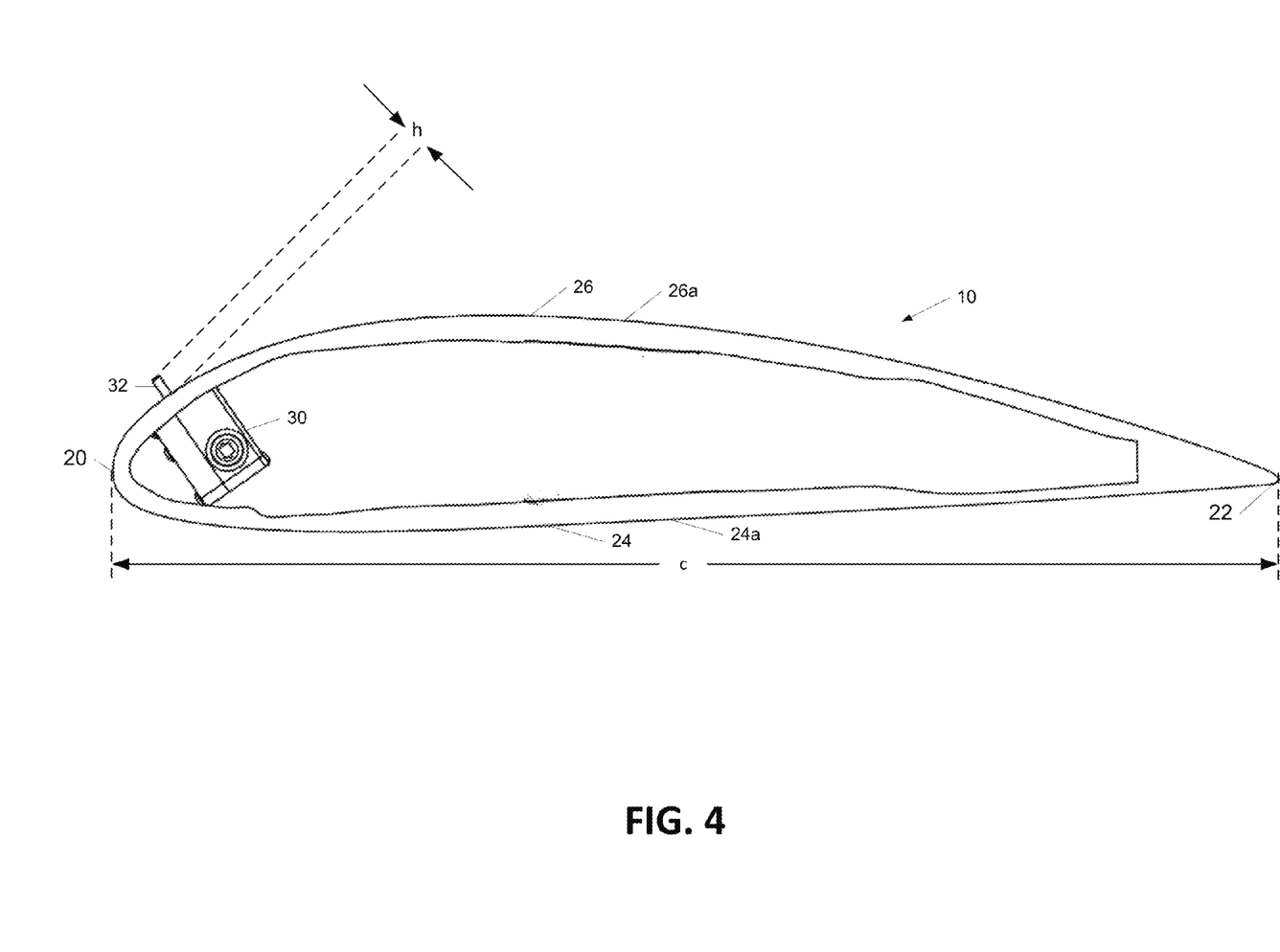
FIG. 4 is cross-section through a rotor blade depicting an air deflector according to one aspect of the invention.

FIG. 4 illustrates a cross section of rotor blade 10 employing an air deflector 32 as an example of a load management device 28 according to one or more aspects of the invention. As can be seen in FIG. 4, rotor blade 10 further includes at least one actuator 30. Air deflector 32 is movable between an extended position in which the air deflector 32 extends from an exterior surface of the rotor blade 10 and a retracted position in which the air deflector 32 is substantially flush with, recessed from, or otherwise does not materially extend from the exterior surface of the rotor blade 10. For example, actuator 30 may extend and retract air deflector 32 according to sensed operating conditions when directed by, e.g., a controller (not shown).

FIG. 4 depicts a placement of actuator 30 and air deflector 32 to affect the airflow on the low pressure side 26 of rotor blade 10. However, in practice, actuator 30 and air deflector 32 may be placed to affect the airflow on the high pressure side 24 of rotor blade 10. Further, actuator 30 and air deflector 32 may be placed in any position chordwise along rotor blade, such that in some embodiments air deflector 32 will be disposed in the trailing half of rotor blade 10 rather than the leading half as depicted. Further, and as will be discussed more fully, rotor blade 10 may comprise more than one actuator 30 and/or air deflector 32.

Air deflector 32 may be sized based on the desired wind turbine condition parameter and further in view of the number of load management devices 28 used. Air deflector 32 may be made from any suitable material, such as fiberglass, carbon fiber, stainless steel, plastic, polycarbonate, and/or aluminum, etc. Air deflector 32 may be of any desired width, for example from a few inches to several feet. Additionally, air deflector 32 may extend from the airfoil surface to any desired height, e.g., from less than a percent to a few percent of the chord c, and air deflector 32 may have any suitable thickness based on the material chosen, typically less than one inch.

Figure 5:
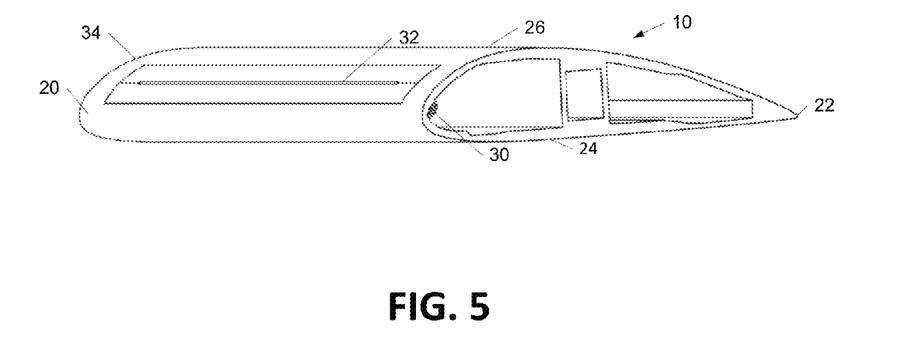
FIG. 5 is an isometric sectional view through the rotor blade depicting the air deflector of FIG. 4 in a retracted position.
Figure 6:
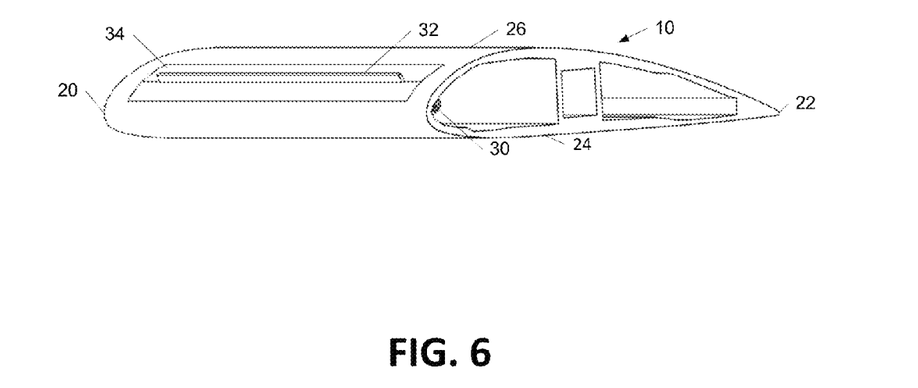
FIG. 6 is an isometric sectional view through the rotor blade depicting the air deflector of FIG. 4 in an extended position.

FIGS. 5-6 are isometric sectional views through the rotor blade 10 depicting the actuator 30 with the air deflector 32 in a retracted position (FIG. 5) and in an extended position (FIG. 6). The actuator 30 is suitably mounted by an interface to substantially maintain the surface contour the rotor blade 10. In another arrangement, the leading face of the actuator 30 may be mounted to the underside of the rotor blade 10. Suitable fastening arrangements such as hardware and adhesives may be used.

Figure 7:
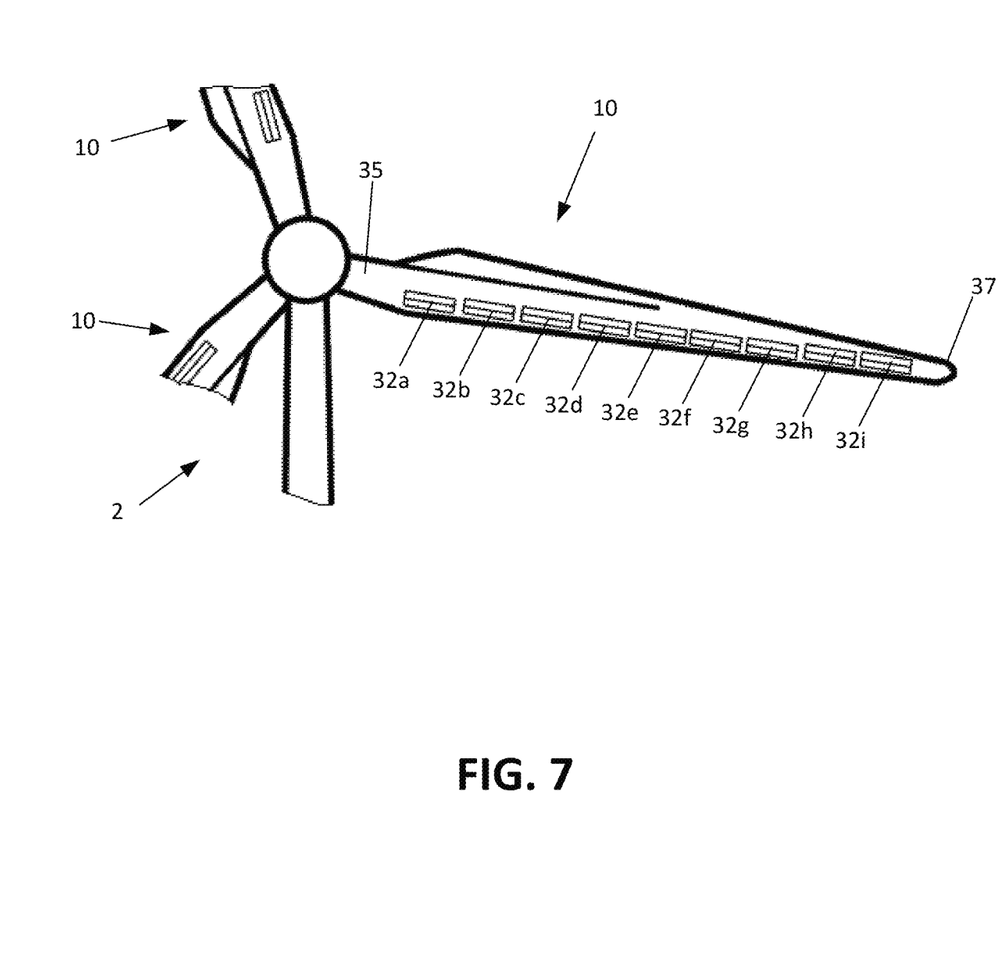
FIG. 7 is a schematic of a rotor blade comprising multiple air deflectors arranged spanwise alone the rotor blade.

According to some aspects of the invention, multiple load management devices 28 may be provided on a rotor blade 10. For example, in some embodiments multiple actuators 30 and/or air deflectors 32 may be arranged and spaced spanwise along the length of rotor blade 10. As illustrated in FIG. 7, multiple air deflectors 32a-32i may be arranged along rotor blade 10. In FIG. 7, the remaining components of wind turbine 2 (e.g., other rotor blades 10, tower 6, foundation 4, etc.) have been truncated and/or not depicted for simplicity. However, one skilled in the art given the benefit of this disclosure will appreciate that the two additional rotor blades 10 may comprise multiple air deflectors 32 arranged in a similar fashion as those depicted in FIG. 7. In such embodiments comprising multiple load management devices 28 (e.g., multiple actuators 30 and/or air deflectors 32) the number of load management devices 28 actuated (e.g., extended) at any given time may depend on sensed operating conditions of the rotor blade 10 and/or wind turbine 2. For example, in some instances a sensor (e.g., accelerometer, differential-pressure sensor, speed sensor, power sensor, etc.) may determine that the rotor speed of wind turbine 2 is at or above a maximum rated speed for wind turbine 2. According, a controller or other suitable device (not shown) may instruct on or more actuators 30 to actuate one or more air deflectors 32 in order to bring the rotor speed and/or loads within an acceptable range.

Returning to FIG. 7, in some embodiments all available load management devices 28 (e.g., air deflectors 32a-32i) may be actuated in order to bring the rotor speed and/or loads into acceptable ranges. For example, if the wind turbine 2 is experiencing very high winds, all available load management devices 28 (e.g., air deflectors 32a-32i) may be actuated in order to avoid, e.g., shutdown of the wind turbine. In other embodiments, however, a controller or other device may determine than less than all of the load management devices 28 (e.g., air deflectors 32a-32i) provided on a rotor blade 10 are needed to be actuated in order to bring the rotor speed and/or sensed loads within an acceptable range. In such embodiments, the controller or similar device will instruct one or more actuators 30 to actuate less than all of the available air deflectors 32a-32i according to a determined activation sequence, as will be discussed more fully.

In some embodiments, because the controller will not always actuate all of the available air deflectors 32a-32i, some air deflectors 32 may be actuated more than others other the life of the system (e.g., the blade 10 and/or the wind turbine 2). For example, each air deflector 32 may affect loads differently depending on, e.g., a spanwise location along blade 10 of air deflector 32. For example, air deflector 32a (e.g., a most-inboard of the air deflectors 32 located near root 35 of blade 10) may affect loads quite differently than air deflector 32i (e.g., a most-outboard of the air deflectors 32 located near tip 37 of blade 10). Thus, in some embodiments, a controller may actuate air deflector 32a more frequently than 32i to control loads. In such embodiments, air deflector 32a may become hyperactive (e.g., used more often than the other air deflectors 32 along blade 10). Overuse of one air deflector may lead to failure of the hyperactive deflector well before others, causing, e.g., shut down of the wind turbine 2 to repair, e.g., the hyperactive deflector.

According to some embodiments of the invention, the overall wind turbine 2 system may be preserved (e.g., suffer less shut downs, etc.) by varying which air deflectors 32 are actuated such that, e.g., the duty cycle (e.g., a number of deployed/retracted cycles subject to) of each of air deflector 32 is comparable. This may lead to, e.g., less shut downs of wind turbine 2. For example, if the duty cycle of each air deflector 32 is nearly equal, wind turbine 2 may only need to be shut down for maintenance (e.g., replacement of air deflectors 32, etc.) near a time when every air deflector 32 has reached its usable life.

Further, because each air deflector 32 may affect loads and/or power generation of wind turbine 2 differently depending on, e.g., operating conditions, etc., actuating a less effective air deflector 32 for the particular conditions may lead to an increase of duty cycles for the system as a whole. By way of example, in some operating conditions (e.g., wind speeds, rotor speeds of wind turbine 2, pitch of blades 10, etc.) air deflector 32i (e.g., an outboard-most air deflector 32) may be more effective at reducing loads than, e.g., air deflector 32a (e.g., an inboard-most air deflector 32). Accordingly, if a controller determines that one or more air deflectors 32 need be actuated in order to, e.g., reduce loads on wind turbine 2 for the given operating conditions, actuating air deflector 32a will be less effective than actuating air deflector 32i. Thus, if the controller does actuate air deflector 32a, it may need to ultimately actuate more air deflectors 32 in order to achieve the desired load reduction than if it had actuated air deflector 32i. Put another way, in this embodiment it may take two or more inboard air deflectors 32 (e.g., air deflectors 32 near root 35) to perform the same load reduction benefits as one outboard air deflector 32 (e.g., air deflectors 32 near tip 37). Thus, the duty cycles of air deflectors 32 for this system as a whole may increase because more air deflectors 32 are actuated (in the example, two) than may be needed (e.g., one).

According to some aspects of the invention, a controller, etc., may use different actuation sequences to actuate one or more air deflectors 32a-32i (but, e.g., less than all air deflectors 32a-32i) along blade 10 in order to, e.g., reduce the duty cycles for each air deflector 32 and/or the system as a whole while still achieving the desired load-reduction and/or increased power benefits. For each sequence, the controller may first determine operating conditions (e.g., wind speed, rotor speed of wind turbine 2, pitch of blades 10, etc.) and determine which actuation sequence to use accordingly.

For example, in some embodiments one or more air deflectors 32 may be actuated using a root-to-tip sequence. As illustrated in FIG. 7, a plurality of air deflectors 32a-32i may be arranged along blade 10 from a root 35 of the blade 10 to a tip 37 of the blade 10. For some operating conditions, a controller may determine that inboard air deflectors 32 (e.g., those located closer to root 35) may be more effective at achieving a desired result (e.g., reducing a load on wind turbine 2, achieving a maximum power output, e.g.) than outboard air deflectors 32 (e.g., those located closer to tip 37). Accordingly, for such operating conditions, the controller may actuate more than one air deflector 32 using a root-to-tip sequence. For such an actuation sequence, the controller may actuate a desired number of air deflectors 32 located closest to the root 35 (e.g., the inboard-most air deflectors 32). For example, if the controller determines that the operating conditions are such that inboard-most air deflectors 32 will most effectively achieve a desired result, and if the controller determines it will need to actuate one inboard air deflector 32 to achieve that result, the controller may, e.g., follow a root-to-tip actuation sequence and thus actuate air deflector 32a. In other embodiments, if the controller determines that the operating conditions are such that inboard-most air deflectors 32 will most effectively achieve a desired result, and if the controller determines it will need to actuate four inboard air deflectors 32 to achieve that result, the controller may, e.g., follow a root-to-tip actuation sequence and thus start with an inboard-most air deflector 32a and actuate the next three inboard-most air deflectors 32b-32d. Such an actuation sequence may ultimately reduce the total duty cycles for the system as a whole, because less (but more effective) air deflectors 32 may be actuated to achieve the desired result.

In other embodiments, one or more air deflectors may be actuated using a tip-to-root sequence. That is, for some operating conditions, a controller may determine that outboard air deflectors 32 may be more effective at achieving a desired result (e.g., reducing load on wind turbine 2, achieving a maximum power output, etc.) than inboard air deflectors 32. Accordingly, for such operating conditions, the controller may actuate more than one air deflector 32 using a tip-to-root sequence. For such an actuation sequence, the controller may actuate a desired number of air deflectors 32 located closest to the tip 37 (e.g., the outboard-most air deflectors 32). For example, if the controller determines that the operating conditions are such that outboard-most air deflectors 32 will most effectively achieve a desired result, and if the controller determines it will need to actuate one outboard air deflector 32 to achieve that result, the controller may, e.g., follow a tip-to-root actuation sequence and thus actuate air deflector 32i. In other embodiments, if the controller determines that the operating conditions are such that outboard-most air deflectors 32 will most effectively achieve a desired result, and if the controller determines it will need to actuate four outboard air deflectors 32 to achieve that result, the controller may, e.g., follow a tip-to-root actuation sequence and thus start with an outboard-most air deflector 32i and actuate the next three inboard-most air deflectors 32f-32h. Such an actuation sequence may ultimately reduce the total duty cycles for the system as a whole, because less (but more effective) air deflectors 32 may be actuated to achieve the desired result.

In other embodiments, one or more air deflectors 32 may be actuated using a maximum-distributed-load actuation sequence. For example, in some embodiments one or more sensors (e.g., pressure-differential sensors, accelerometers, speed sensors, etc.) may be provided along the length of blade 10 to measure and/or approximate, e.g., one or more aerodynamic loads. In some embodiments, a plurality of sensors will be provided, one at the approximate location of each air deflector 32a-32i. For example, in the embodiment depicted in FIG. 7, blade 10 may comprise nine sensors, each at an approximate location of a corresponding air deflector 32a-32i. In some embodiments, one or more controllers may determine which sensors are experiencing the largest aerodynamic loads, and actuate a corresponding air deflector 32 at the approximate location of the sensor experiencing the largest aerodynamic loads. For example, one or more controllers may determine that, e.g., three air deflectors 32 need to be actuated in order to, e.g., reduce the load acting on wind turbine 2. Further, the one or more controllers may determine that a sensor located at approximately the same location as air deflector 32e is experiencing the maximum aerodynamic load among a location at each of the air deflectors 32a-32i. Accordingly, the one or more controllers, using a maximum-distributed-load actuation sequence, may accordingly actuate air deflector 32e, and then proportionally actuate surrounding air deflectors 32 to reach the total the number of required air deflectors 32 (e.g., air deflector 32f and air deflector 32d). In such an embodiment, the duty cycles of the overall system (e.g., blade 10 and/or wind turbine 2) may be reduced. For example, a smaller number of total air deflectors 32 may ultimately be actuated because the air deflectors 32 located at the location of maximum aerodynamic loads may be the most effective at achieving the desired result (e.g., reducing loads acting on wind turbine 2).

In some embodiments, one or more air deflectors 32 may be actuated using a random actuation sequence. For example, if (as discussed) one or more air deflectors 32 are routinely actuated, the one or more routinely actuated air deflectors 32 may experience much higher duty cycles than other less routinely actuated air deflectors over the life of the system. Thus, in some embodiments, one or more controllers may distribute duty cycles among air deflectors 32 using a random actuation sequence. In such embodiments, once the controller determines one or more air deflectors 32 needs to be actuated, it may randomly choose (using, e.g., a random number generator or other well-known method) one or more air deflectors 32 to actuate. By way of example, if one or more controllers determines, e.g., that three air deflectors 32 need to be actuated in order to reduce loads on wind turbine 2 for the current operating conditions, the one or more controllers may choose three air deflectors 32 at random to actuate (e.g., air deflector 32c, air deflect 32e, and air deflector 32h). In such embodiments, the life of the overall system (e.g., blade 10 and/or wind turbine 2) may be extended because all air deflectors 32 may be on an approximately equal basis. Accordingly, no one air deflector 32 will experience, e.g., early failure due to hyperactivity.

In some embodiments, one or more air deflectors 32 may be actuated using a cycle-count actuation sequence. In such embodiments, one or more controllers may record the cumulative duty cycles for each air deflector 32. In this embodiment, when the one or more controllers determine one or more air deflectors 32 need to be actuated, the one or more controllers may reference the cumulative deployment cycles for each air deflector 32 and actuate one or more air deflectors 32 having the lowest total cumulative deployment cycles. In such an embodiment, the least-used air deflectors 32 are thus selected and the life of the overall system (e.g., blade 10 and/or wind turbine 2) may be extended.

Figure 8:
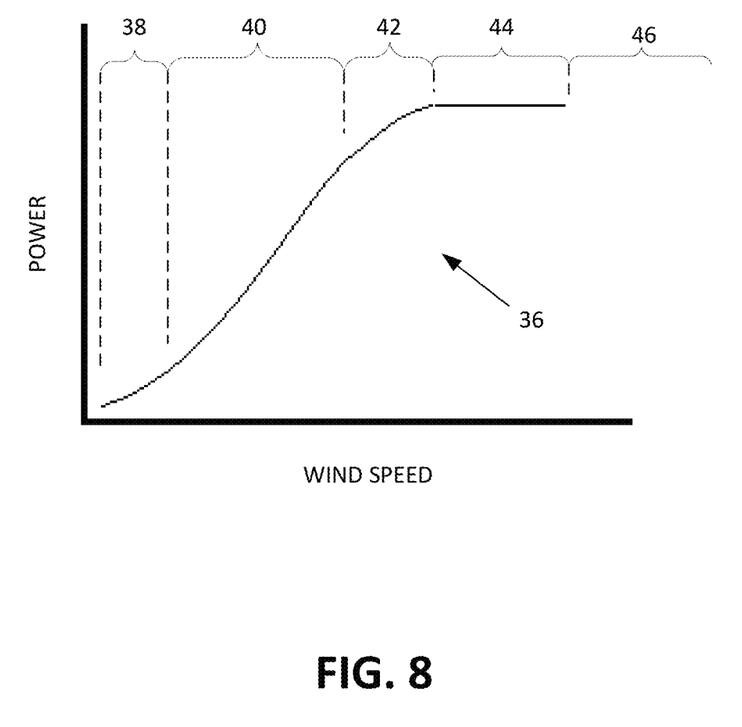
FIG. 8 is a schematic of an illustrative power curve for a wind turbine.

In some embodiments, more than one of the above actuation sequences (e.g., root-to-tip, tip-to-root, maximum-distributed-load, random, and/or cycle-count) may be combined on a blade 10 and/or among multiple blades 10 of wind turbine 2 to achieve a desired result (e.g., maximum power production while eliminating excessive loads, etc.). For example, in some embodiments, a combination of root-to-tip and tip-to-root actuation sequences may be used. This may be more readily understood with reference to a typical wind turbine 2 power curve 36 as depicted in FIG. 8. As discussed, due to well-known principles of aerodynamics, a lift force on each blade 10 of wind turbine 2 will increase as the wind speed across the blade 10 increases. Thus, with increase wind speeds, a rotor of wind turbine 2 will spin faster and produce more power. However, if wind speeds become too high, a maximum-rated rotor speed of the wind turbine 2 may be exceeded if one or more attributes of the wind turbine 2 is not adjusted to, e.g., control rotor speed. Accordingly, for high wind speeds, characteristics of the blades 10 and/or wind turbine 2 are adjusted so as to keep the rotor speed of wind turbine 2 constant (e.g., at or below a maximum-rated speed) as will be more fully discussed.

As depicted in FIG. 8, power curve 36 may be more easily understood as a series of regions 38-46. In startup region 38, wind speeds are relatively low. In this region, blades 10 may not be spinning very fast such that little power is actually produced. However, as wind speeds over the rotor blades 10 increase, the wind turbine 2 enters variable speed region 40. In such a region, the speed of a rotor of wind turbine 2 will vary with wind speed. That is, as the wind speed increases, the lift force on each blade 10 increases causing the rotor to spin faster and thus produce more power. As the wind speeds over the blades 10 decrease, the lift force on each blade 10 corresponding decreases resulting in the rotor of wind turbine 2 to spin slower and thus produce less power. When wind turbine 2 is operating in variable speed region 40, characteristics of wind turbine 2 and/or blades 10 (e.g., pitch, actuation of air deflectors 32, etc.) may be configured to maximize power production. That is, because the wind turbine 2 is not operating at a maximum-rated speed, the characteristics of blades 10/wind turbine 2 are not adjusted to, e.g., purposely slow down wind turbine 2.

However, as wind turbine 2 enters transition/knee region 42, wind speeds are high enough that wind turbine 2 is approaching a maximum-rated speed (e.g., a speed at which components of wind turbine 2 may begin to fail if exceeded). As such, in the transition/knee region 42, one or more characteristics of blade 10 and/or wind turbine 2 may be altered such the speed of wind turbine 2 (and thus accordingly, power production) is limited. For example, as shown in FIG. 8, the second derivative of the power curve 36 is negative in transition/knee region 42. Thus, although speed of wind turbine 2 (and accordingly power production) will continue increase with wind speed in the transition/knee region 42, it will do so at a decreasing rate. This may due to, e.g., one or more controllers altering one or more characteristics of blade 10 and/or wind turbine 2 (e.g., changing pitch of blade 10, extending or retracting tip portion 18, actuating one or more air deflectors 32, etc.) to destroy lift on one or more blades 10.

After the transition/knee 42 region, the wind turbine 2 may enter a constant speed region 44. In constant speed region 44, the wind speeds passing over blades 10 may be high enough that characteristics of blade 10/wind turbine 2 are altered in order to keep the rotor speed (and thus power production) constant even if the wind speed continues to increase. For example, the wind turbine 2 may be kept at or less than a maximum-rated rotor speed. This may be accomplished by, e.g., altering one or more characteristics of wind turbine 2 and/or blades 10 in order to, e.g., destroy lift acting on blades 10. For example, a pitch of or more blades 10 may be altered, tip portion 18 may be deployed or retracted, and/or one or more air deflectors 32 may be actuated.

Finally, wind turbine 2 may enter shutdown region 46 after constant speed region 44. Shutdown region 46 may be a region where, e.g., wind speeds are so great that a rotor speed of wind turbine 2 may not be appropriately controlled (e.g., maintained at or below a maximum-rated speed) and thus wind turbine 2 is shut down to avoid, e.g., damage to wind turbine 2 and/or its components. For example, altering the pitch of blades 10, extending or retracting tip portion 18, and/or actuating one or more air deflectors 32 in shutdown region 46 may be ineffective at keeping the rotor speed at or below a maximum-rated speed. Accordingly, in shutdown region 46, wind turbine 2 may be shut down and/or locked into a non-spinning position to avoid damage to its components.

In some embodiments, a particular actuation sequence (as discussed) may be implemented by one or more controllers depending on what region of the power curve 36 wind turbine 2 is operating. For example, if a wind turbine 2 is operating in constant speed region 44, outboard air deflectors 32 (e.g., air deflector 32i and others close to tip 37) may not be effective due to, e.g., pitch control of blades 10. Accordingly, a tip-to-root actuation sequence in such region may be inappropriate, as more air deflectors 32 may ultimately need be deployed to achieve a desired result (e.g., load reduction) under a tip-to-root actuation sequence than under, e.g., a root-to-tip actuation sequence. That is, pitch control of blades 10 may affect the effectiveness of air deflectors 32 located at the root 35 less than it affects the effectiveness of air deflectors 32 located at tip 37. Accordingly, for a wind turbine 2 operating in constant speed region 44, one or more controllers may actuate air deflectors using, e.g., a root-to-tip actuation sequence as discussed.

However, these outboard air deflectors 32 located near tip 37 (e.g., deflector 32i and the like) may be more effective in, e.g., the transition/knee region 42 due to, e.g., the pitch of the blades 10 or other characteristics of wind turbine 2 in that region. Accordingly, when the wind turbine 2 is operating in transition/knee region 42, one or more controllers may actuate air deflectors 32 using a tip-to-root actuation sequence as discussed.

Further, in order to preserve the system, reduce overall duty cycles of the air deflectors 32, etc., one or more of the described actuation sequences may be used in combination. For example, a controller may, e.g., employ a combination of root-to-tip and tip-to-root actuation sequences. In such an embodiment, the controller may first determine operating conditions (e.g., wind speed, rotor speed, loads acting on the blades 10 and/or components of wind turbine 2, etc.) and determine an appropriate activation sequence to employ accordingly. For example, in response to determining the wind turbine is operating in, e.g., variable speed region 40, one or more controllers may not actuate any air deflectors 32 (in order to, e.g., achieve a maximum power output for the given wind speed). However, if the winds increase and the wind turbine begins to operate in, e.g., the knee/transition region 42 of power curve 36, the controller may actuate air deflectors 32 according to a tip-to-root actuation sequence. As described above, due, e.g., the pitch control of blades 10 and other characteristics of wind turbine 2 in this region, the outboard-most air deflectors 32 may be most effective in this region, making a tip-to-root actuation sequence appropriate. However, if wind speeds should increase thus causing wind turbine 2 to operate in the constant speed region 44 of power curve 36, the one or more controllers may switch to using a tip-to-root actuation sequence. Again, due to, e.g., pitch control of blades 10 and/or other characteristics of wind turbine 2 operating in constant speed region 44, outboard air deflectors 32 may be less effective at this region making a root-to-tip actuation sequence more appropriate. In such an embodiment, the duty cycle for each of the air deflectors 32 may be relatively equal over the lifetime of the system because, e.g., inboard air deflectors 32 may be used in certain operating conditions, and outboard air deflectors 32 may be used in others.

Any of the other above described actuation sequences may be used in combination to achieve similar benefits. For example, in some embodiments a random actuation sequence may be combined with a root-to-tip actuation sequence and/or a tip-to-root actuation sequence. For example, in embodiments of wind turbine 2 where each of blades 10 comprises a plurality of air deflectors 32, a random actuation sequence may be employed on less than all of the blades 10, with a different actuation sequence (e.g., root-to-tip, tip-to-root, maximum-distributed-load, etc.) employed on the remaining blades 10.

For example, and as described above, by using a random actuation sequence, duty cycles may be roughly equal among each air deflector 32 over the life of the system. However, for some operating conditions, random actuation of the air deflectors 32 on all blades 10 at once may be, e.g., too chaotic and/or lead to poor results (e.g., less than desired load reduction, poor power performed, increased duty cycles for the overall system, etc.). In such embodiments, employing, e.g., a root-to-tip, tip-to-root, or maximum-distributed-load actuation sequence on one or more blades 10 of the system may stabilize the system and thus ultimately lead to the desired results (e.g., decreased loads, decreased duty cycles, increased power production, etc.). Accordingly, in some embodiments, less than all of the blades 10 may employ a random actuation sequence, with the remaining blade(s) 10 employing, e.g., one of the other described actuation sequences (e.g., root-to-tip, tip-to-root, maximum-distributed-load, etc.). Further, the controller may rotate which blade 10 employs each sequence (e.g., rotate which blade 10 of the plurality of blades 10 utilizes an actuation sequence other than random actuation) such that the benefits of random actuation (e.g., approximately equal duty cycles among each air deflector 32) may still be achieved across the entire system.

In some embodiments a cycle-count actuation sequence may be combined with, e.g., root-to-tip, tip-to-root, and/or maximum-distributed-load actuation sequences in a similar manner. For example, for less than all of the blades 10 a cycle-count actuation sequence may be employed (in order to, e.g., approximately distribute duty cycles among each air deflector 32) while for the remaining blade(s) 10 any of the other described actuation sequences may be employed in order to, e.g., stabilize the system. As with the combination of one or more blades 10 employing a random actuation sequence and the remaining blades employing a different actuation sequence, the actuation sequence employed on each blade 10 in this embodiment (e.g., cycle-count actuation sequence versus another actuation sequence) may be rotated in order to, e.g., achieve the system-wide benefits of using cycle-count actuation methods as described.

In other embodiments, a cycle-count and/or a random actuation sequence may be alternated on a given blade 10 with one or more different actuation sequences (e.g., root-to-tip, tip-to-root, maximum-distributed-load, etc.) in order to, e.g., distribute duty cycles among each included air deflector 32. For example, in some embodiments a root-to-tip actuation sequence may be employed on a blade 10 and, once stabilized, the blade 10 may switch to, e.g., a cycle-count actuation sequence. In other embodiments, a maximum-distributed-load actuation sequence may be employed on a blade 10 and, once stabilized, the blade 10 may switch to, e.g., a random actuation sequence. Accordingly, the relative duty cycles of each air deflector 32 may remain approximately equal.

The above combinations of specific actuation sequences are provided for illustrative purposes only. One skilled in the art, given the benefit of this disclosure, will recognize that any of the above described actuation sequences may be combined to achieve similar beneficial results.

Although each of the above described actuation sequences were discussed in relation to a blade-based actuation sequence (e.g., one or more air deflectors 32 actuated on a given blade 10), any of the described actuation systems may be employed as a rotor-based actuation sequence. For example, rather the determining how many air deflectors 32 must be actuated on a single blade 10 in response to determined operating conditions and then employing a particular actuation sequence on that blade 10 as discussed, in some embodiments a total number of air deflectors 32 needed to be actuated on a rotor as a whole may be determined and then one or more of the above actuation sequences may be employed with respect to that rotor as a whole.

By way of example, one or more controllers may determine from sensed operating conditions (by, e.g., an accelerometer, pressure-differential sensor, speed sensor, etc.) that one or more air deflectors 32 need to be actuated in order to bring loads acting on wind turbine 2 and/or a rotor speed of wind turbine 2 within an acceptable level. Accordingly, the one or more controllers may determine a total number of air deflectors to be actuated for the wind turbine 2 rotor as a whole. For example, the one or more controllers may determine that seven total air deflectors 32 need to be actuated to achieve a desired result (e.g., bring rotor to an acceptable speed). Accordingly, the one or more controllers may actuate seven air deflectors 32 using any of the described actuation methods in a rotor-based manner.

For example, if the one or more controllers actuates the seven air deflectors 32 using a root-to-tip actuation sequence, it may actuate the seven inboard-most air deflectors 32 with respect to the rotor as a whole. Thus, the one or more controllers may actuate, e.g., air deflectors 32a, 32b, and 32c on the depicted blade 10 in FIG. 7, along with the two inboard-most air deflectors 32 on each of the other two blades 10 (partially show in FIG. 7). In another example, if the one or more controllers actuates the seven air deflectors 32 using a tip-to-root actuation sequence, it may actuate the seven outboard-most air deflectors 32 with respect to the rotor as a whole. Thus, the one or more controllers may actuate, e.g., air deflectors 32g, 32h, and 32i on the depicted blade 10 in FIG. 7, along with the two outboard-most air deflectors 32 on each of the other two blades 10 (partially show in FIG. 7).

In another example, if the one or more controllers actuates the seven air deflectors 32 using a random actuation sequence, it may actuate seven random air deflectors 32 across the entire rotor system. Thus, one of blades 10 may have, e.g., one air deflector 32 actuated at any random location along its length, another of blades 10 may have, e.g., two air deflectors 32 actuated at any random location along its length, and another of blades 10 may have, e.g., four air deflectors 32 actuated at any random location along its length.

Similarly, in some embodiments the one or more controllers may actuate the seven air deflectors 32 using a cycle-count actuation sequence. In such embodiments, the one or more controllers may, e.g., determine the seven air deflectors 32 out of all air deflectors 32 included on wind turbine 2 which have been cumulatively actuated the least. For example, in FIG. 7, if each of the two partially shown blades 10 similarly comprise nine air deflectors 32 as with the fully shown blade 10, then the one or more controllers in this embodiment may determine the seven air deflectors 32 out of the twenty-seven total air deflectors 32 which have been actuated the least and accordingly actuate each of those seven to achieve the desired result.

For any of the described actuation sequences (e.g., root-to-tip, tip-to-root, maximum-distributed-load, random, cycle-count, etc.), and for either blade-based or rotor-based actuation systems, each air deflector 32 actuated may have a different maximum height (e.g., a height from one of low pressure side 26 or high pressure side 24 to the edge of the actuated air deflector 32 as indicated by "h" in FIG. 4) than other air deflectors 32 provided on any of the blades 10. For example, returning to FIG. 7, air deflector 31a may have a different maximum height than, e.g., air deflector 32e. In some embodiments, each air deflector may have a maximum height equal to, e.g., a certain percentage of a corresponding chord length ("c" in FIG. 4) at the spanwise location of blade 10 where the air deflector 32 is located. Accordingly, because chord length may vary along the length of blade 10 (e.g., may be longer at a location of air deflector 32a than a location of air deflector 32e), so too may a maximum height of each air deflector 32 vary along the length of blade 10 (e.g., air deflector 32a may have a greater maximum height than, e.g., air deflector 32e).

Further, in any of the described actuation sequences (e.g., root-to-tip, tip-to-root, maximum-distributed-load, random, cycle-count, etc.) and for either blade-based or rotor-based actuation systems, each air deflector 32 actuated may be configured to be actuated to a variable height. For example, actuator 30 of each air deflector 32 may be such that each air deflector 32 may be actuated to a maximum height or any fraction thereof. Accordingly, depending on, e.g., a spanwise location of a particular air deflector 32, the determined operating conditions of the wind turbine 2, and/or a desired result by actuating one or more air deflectors 32, the one or more controllers may actuate each air deflector to a variable height. In such embodiments, this finer-grain (e.g., variable height) actuation may result in, e.g., better control performance. For example, through variable height activation, the one or more controllers may be able to achieve, e.g., more load reduction with less power loss.

In some embodiments, air deflectors 32 may be actuated according to a distributed actuation system. For example, in some embodiments each blade 10 may comprise multiple air deflectors (e.g., air deflectors 32a-32i as depicted in FIG. 7) with each air deflector 32 comprising a corresponding sensor (e.g., pressure-differential, accelerometer, speed, etc.) and/or controller (not shown). In such embodiments, the corresponding controller of a particular air deflector 32 may read a corresponding sensor measurement, and determine a fraction of actuation for that particular air deflector accordingly (e.g., 0 to 100% actuation). For example, each controller may determine operating conditions (e.g., wind speed, acceleration, aerodynamic load, etc.) at the location of a corresponding air deflector 32 (according to, e.g., a reading of the sensor provided at that location) and actuate that air deflector 32 if necessary to, e.g., reduce load.

Further, and as discussed, air deflector 32 may be capable of being actuated to a variable height. Thus, a controller corresponding to a specific air deflector 32 may determine for some operating conditions that the air deflector 32 does not need to be actuated, and thus the air deflector 32 will be actuated to 0% of its maximum height. For other operating conditions, the controller corresponding to a specific air deflector 32 may determine that the air deflector 32 needs to be actuated, but not fully, and thus the controller may actuate the air deflector 32 to, e.g., a fraction of its maximum height (e.g., 50%). For still other operating conditions, the controller corresponding to specific air deflector 32 may determine that the air deflector 32 needs to be actuated to a maximum height, and thus the controller may actuate the air deflector 32 to its maximum height (e.g., 100%). Systems employing such a distributed actuation may, in some embodiments, have higher reliability than other systems (e.g., systems not utilizing a sensor and/or controller at each air deflector 32) because if one controller/air deflector 32 combination fails, other controller/sensor/air deflector 32 combinations may still operate.

The methods and features recited herein may further be implemented through any number of computer readable media that are able to store computer readable instructions. Examples of computer readable mediums that may be used include RAM, ROM, EEPROM, flash memory, or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for actuating load management devices on an airfoil, the method comprising:
   determining, by an airfoil control device, a first operating condition at an airfoil including a plurality of load management devices;
   identifying, by the airfoil control device, a first number of load management devices of the plurality of load management devices based on the determined first operating condition;
   identifying, by the airfoil control device, a first actuation sequence for actuating the first number of load management devices in a first determined order based on the determined first operating condition, wherein the first actuation sequence is configured to actuate any of the first number of load management devices independent of remaining load management devices in the first determined order; and
   actuating, by the airfoil control device, the first number of load management devices according to the first actuation sequence based on the determined first operating condition;
   determining, by the airfoil control device, a second operating condition at the airfoil;
   identifying, by the airfoil control device, a second number of load management devices of the plurality of load management devices based on the determined second operating condition;
   identifying, by the airfoil control device, a second actuation sequence for actuating the second number of load management devices in a second determined order based on the determined second operating condition, wherein the second actuation sequence is configured to actuate any of the second number of load management devices independent of remaining load management devices in the second determined order;
   actuating, by the airfoil control device, the second number of load management devices according to the second actuation sequence based on the determined second operating condition.

2. The method of claim 1, wherein the plurality of load management devices are configured to be actuated to variable heights, and wherein actuating the first number of load management devices according to the first actuation sequence comprises actuating a first load management device to a different height than a second load management device.

3. The method of claim 1, wherein the first actuation sequence is an airfoil root-to-tip actuation sequence such that actuating the first number of load management devices comprises first actuating an inboard-most load management device.

4. The method of claim 3, wherein the airfoil is part of a wind turbine, wherein determining the first operating condition at the airfoil includes determining at least one of a rotor speed of the wind turbine and a power output of the wind turbine, and wherein identifying the airfoil root-to-tip actuation sequence is responsive to determining at least one of: the rotor speed of the wind turbine is at or above a maximum-rated rotor speed and the power output of the wind turbine is at or above a maximum-rated power output.

5. The method of claim 1, wherein the first actuation sequence is an airfoil tip-to-root actuation sequence such that actuating the first number of load management devices includes first actuating an outboard-most load management device.

6. The method of claim 5, wherein the airfoil is part of a wind turbine, wherein determining the first operating condition at the airfoil includes determining at least one of: a rotor speed of the wind turbine and a power output of the wind turbine, and wherein identifying the airfoil tip-to-root actuation sequence is responsive to determining at least one of: the rotor speed of the wind turbine is less than a maximum-rated rotor speed and the power output of the wind turbine is less than a maximum-rated power output.

7. The method of claim 1, wherein determining the first operating condition at the airfoil includes determining an aerodynamic load acting on the airfoil at a location of each of the plurality of load management devices.

8. The method of claim 7, wherein the first actuation sequence is a maximum-distributed-load sequence such that actuating the first number of load management devices includes actuating at least one of the load management devices disposed at a location of a maximum load of the determined aerodynamic loads.

9. The method of claim 1, further comprising:
   determining, by the airfoil control device, a cycle count indicating how many times each of the plurality of load management devices has previously been actuated, wherein the first actuation sequence is a cycle-count actuation sequence such that actuating the first number of load management devices includes actuating a load management device having a minimum cycle count of the determined cycle count.

10. The method of claim 1, wherein the first actuation sequence is a random sequence such that actuating the first number of load management devices on the airfoil includes actuating at least one randomly located load management device of the plurality of load management devices.

11. A method for actuating load management devices on blades of a wind turbine, the method comprising:
   determining, by a blade control device, a first operating condition of the wind turbine; and
   for each blade of a plurality of blades of the wind turbine:
      identifying, by the blade control device, a first number of load management devices of a plurality of load management devices on the blade based on the determined first operating condition;
      identifying, by the blade control device, a first actuation sequence for actuating the first number of load management devices in a first determined order based on the determined first operating condition, wherein the first actuation sequence is configured to actuate any of the first number of load management devices independent of remaining load management devices in the first determined order; and
      actuating, by the blade control device, the first number of load management devices according to the first actuation sequence based on the determined first operating condition;
   determining, by the blade control device, a second operating condition of the wind turbine; and
   for each blade of the plurality of blades of the wind turbine:
      identifying, by the blade control device, a second number of load management devices of the plurality of load management devices on the blade based on the determined second operating condition;
      identifying, by the blade control device, a second actuation sequence for actuating the second number of load management devices in a second determined order based on the determined second operating condition, wherein the second actuation sequence is configured to actuate any of the second number of load management devices independent of remaining load management devices in the second determined order; and
      actuating, by the blade control device, the second number of load management devices according to the second actuation sequence based on the determined second operating condition.

12. The method of claim 11, wherein the first actuation sequence for a first blade of the plurality of blades differs from the first actuation sequence for a second blade of the plurality of blades.

13. The method of claim 12, wherein the first actuation sequence for a first blade is a random sequence such that actuating the first number of load management devices on the first blade includes actuating at least one randomly located load management devices on the first blade.

14. The method of claim 12, wherein the first actuation sequence for a first blade is a blade root-to-tip sequence such that actuating the first number of load management devices on the first blade includes first actuating an inboard-most load management device on the second blade.

15. The method of claim 12, wherein the first actuation sequence for a first blade is a blade tip-to-root sequence such that actuating the first number of load management devices on the first blade includes first actuating an outboard-most load management device on the first blade.

16. The method of claim 11, wherein the plurality of load management devices on a first blade are configured to be actuated to variable heights, and wherein actuating the first number of load management devices on the first blade includes actuating a first load management device of the plurality of load management devices on the first blade to a different height than a second load management device of the plurality of load management devices on the first blade.

17. A method for actuating deflectors on blades of a wind turbine, the method comprising:
   determining, by a controller, a first operating condition at a wind turbine including a plurality of deflectors;
   identifying, by the controller, a first number of deflectors of the plurality of deflectors on the wind turbine based on the determined first operating condition;
   identifying, by the controller, a first actuation sequence for actuating the first number of deflectors in a first determined order based on the determined first operating condition, wherein the first actuation sequence is configured to actuate any of the first number of deflectors independent of remaining deflectors in the first determined order; and
   actuating, by the controller, the first number of deflectors on the wind turbine according to the first actuation sequence based on the determined first operating condition;
   determining, by the controller, a second operating condition at the wind turbine;
   identifying, by the controller, a second number of deflectors of the plurality of deflectors on the wind turbine based on the determined second operating condition;
   identifying, by the controller, a second actuation sequence for actuating the second number of deflectors in a second determined order based on the determined second operating condition, wherein the second actuation sequence is configured to actuate any of the second number of deflectors independent of remaining deflectors in the second determined order; and
   actuating, by the controller, the second number of deflectors on the wind turbine according to the second actuation sequence based on the determined second operating condition.

18. The method of claim 17, wherein identifying the first number of deflectors includes determining, by the controller, at least one deflector of the plurality of deflectors to be actuated on each of a plurality of blades of the wind turbine, wherein a sum of the at least one deflector of the plurality of deflectors to be actuated on each of the plurality of blades totals the first number of deflectors to be actuated on the wind turbine.

19. The method of claim 17, wherein the first actuation sequence is a root-to-tip actuation sequence such that actuating the first number of deflectors on the wind turbine includes first actuating an inboard-most deflector on the wind turbine.

20. The method of claim 17, wherein determining the first operating condition at the wind turbine includes determining an aerodynamic load acting on the wind turbine at a location of each of the plurality of deflectors, and wherein the first actuation sequence is a maximum-distributed-load sequence such that actuating the first number of deflectors on the wind turbine includes actuating a deflector disposed at a location of a maximum load of the determined aerodynamic loads.

* * * * *